United States Patent
Miller et al.

[11] Patent Number: 5,930,736
[45] Date of Patent: Jul. 27, 1999

[54] FAN MONITORING SYSTEM

[75] Inventors: Kevin L. Miller; Anil V. Rao, both of Austin, Tex.

[73] Assignee: Dell USA, L.P., Round Rock, Tex.

[21] Appl. No.: 08/786,169

[22] Filed: Jan. 21, 1997

[51] Int. Cl.$^6$ .................................................. H02H 3/00
[52] U.S. Cl. ..................... 702/127; 702/130; 364/187; 361/695; 318/471
[58] Field of Search .................................. 364/550, 131, 364/557, 183–187; 395/187, 180; 361/695; 388/800–814

[56] References Cited

U.S. PATENT DOCUMENTS

| | | | |
|---|---|---|---|
| 3,622,852 | 11/1971 | Myers | 318/328 |
| 3,676,659 | 7/1972 | Asmussen | 235/186 |
| 3,967,173 | 6/1976 | Stich | 318/227 |
| 4,099,109 | 7/1978 | Abbondanti | 318/227 |
| 4,103,281 | 7/1978 | Strom et al. | 340/18 LD |
| 4,240,014 | 12/1980 | Muller | 318/328 |
| 4,488,216 | 12/1984 | Gyugyi et al. | 363/160 |
| 4,516,060 | 5/1985 | Guzik et al. | 318/341 |
| 4,591,767 | 5/1986 | Koide | 318/314 |
| 4,595,868 | 6/1986 | Louth | 318/608 |
| 4,680,516 | 7/1987 | Guzik et al. | 318/326 |
| 5,384,526 | 1/1995 | Bennett | 318/610 |
| 5,436,827 | 7/1995 | Gunn et al. | 364/187 |
| 5,448,143 | 9/1995 | Pecone | 318/434 |
| 5,469,320 | 11/1995 | Walker et al. | 361/33 |
| 5,623,594 | 4/1997 | Swamy | 395/180 |
| 5,727,928 | 3/1998 | Brown | 417/44.11 |
| 5,825,972 | 10/1998 | Brown | 388/811 |

OTHER PUBLICATIONS

NMB Technologies, Inc., Fan Sensor Information, 1996, pp. 1 through 7.
NMB Technologies, Inc., DC 3610KL Series Fan, 1995, pp. 1 and 2.
"PC9011 Enhanced Keyboard Controller with Real–Time Clock", National Semiconductor, Preliminary Information, Jun. 9, 1994.

*Primary Examiner*—Hezron E. Williams
*Assistant Examiner*—Shah Kamini
*Attorney, Agent, or Firm*—Skjerven, Morrill, MacPherson, Franklin & Friel, LLP; David G. Dolezal

[57] ABSTRACT

A fan monitoring system for an electronics system or a computer system. The fan monitoring system includes a fan which produces a rotation signal, where the rotation signal is a function of the fan rotating. The fan monitoring system also includes a detection circuit responsive to the rotation signal and producing an operating signal indicative of the fan rotating. The fan monitoring system also includes a fan detection circuit having a primary connection point capable of being electrically coupled to the fan. The fan detection circuit provides a detection signal indicative of whether or not the fan is electrically coupled to the fan detection circuit. The fan monitoring system further includes an I/O circuit for receiving the fan detection signal and the operating signal. The I/O circuit providing I/O signals to a host computer system as determined by the operating signal and/or the detection signals.

31 Claims, 3 Drawing Sheets

FAN MONITORING SYSTEM

BACKGROUND OF THE INVENTION

1. Field of the Invention

The present invention relates to a fan monitoring system for electronic systems including computer systems.

2. Description of the Related Art

Electronic components, such as processors, gate arrays, programmable logic, expansion cards, memory chips, disk drive motors, and power supplies generate heat during normal operation. Because these electronic components are usually enclosed within a protective housing such a computer chassis, the heat produced by these components can be trapped within the housing, and thus, cause the temperature to rise within the housing. These high temperatures can damage the semiconductor circuits located within the protective housing or significantly shorten the working life of the electronic components. In some cases, these circuits may catastrophically fail due to the high temperatures.

One common method of reducing the temperature inside the protective housing of electronic systems is to use a fan to circulate the air inside the housing and to bring in cooler air from outside the housing. However, if the fan fails, the heat trapped inside the protective housing can quickly raise the temperature to the point of damaging the circuits. Another problem is that the fan may not be connected or installed properly, due to human error.

What is needed is a system to detect when a fan is not rotating or when a fan is not installed and to provide signals which indicate these conditions.

SUMMARY OF THE INVENTION

It has been discovered that providing an electronic system with a fan monitoring system can prevent damage to the electronic circuitry due to a fan failure or failure to connect the fan to a power source.

More specifically, in one aspect of the invention, a fan monitoring system includes a fan providing a fan rotation signal as a function of fan rotation, and a detection circuit. The detection circuit including an electronic storage element having an input and an output. The output providing an operating signal indicative of the fan rotating. The input receiving the rotation signal. The electronic storage element latching at the output the operating signal in response to the rotation signal.

In another aspect of the invention, the fan monitoring system includes a fan and a fan detection circuit. The fan detection circuit provides a detection signal indicative of whether or not the fan is installed in an electronic system.

In another aspect of the invention, a computer system includes a fan providing a fan rotation signal as a function of fan rotation, a processor, and a fan monitoring circuit. The fan monitoring circuit including an electronic storage element having an input and an output, the output providing an operating signal indicative of the fan rotating. The input receiving the rotation signal. The electronic storage element providing at the output the operating signal in response to the rotation signal. The computer system also includes an input/output (I/O) circuit. The I/O circuit electrically coupled to the output of the electronic storage element and electrically coupled to the processor. The I/O circuit receiving the rotation signal and providing to the processor an I/O rotation signal indicative of whether the fan is rotating as determined by the operating signal.

In another aspect of the invention, a computer system includes a fan and a fan monitoring circuit. The fan monitoring circuit providing a detection signal indicative of whether or not the fan is electrically coupled to the computer system. The computer system also including a processor and an input/output (I/O) circuit, electrically coupled to the processor and electrically coupled to the fan monitoring circuit. The I/O circuit receiving the detection signal and providing to the processor an I/O detection signal indicative of whether the fan is electrically coupled to the computer system as determined by the detection signal.

In another aspect of the invention a computer system includes a processor and a fan. The fan providing a fan rotation signal as a function of fan rotation. The fan capable of being electrically coupled to the computer system. The computer system also includes a fan monitoring circuit including a fan presence detection circuit. The fan detection circuit providing a detection signal indicative of whether or not the fan is coupled to the computer system. The fan monitoring circuit also including a rotation detection circuit. The rotation detection circuit receiving the rotation signal and providing an operating signal indicative of fan rotation in response to the rotation signal. The computer system also including an input/output (I/O) circuit. The I/O circuit electrically coupled to the processor and to the fan monitoring circuit. The I/O circuit receiving the detection signal and the operating signal and providing an I/O signal to the processor as determined by the operating signal and the detection signal.

The present invention provides signals that indicate whether or not a fan is properly installed in an electronic components housing and whether or not the fan is rotating. By providing these signals, the invention can reduce the possibility of damage to the electronic components due to a fan failure, a failure to install the fan, or a failure to connect the fan to a power source.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

The following sets forth a detailed description of the best contemplated mode for carrying out the invention. The description is intended to be illustrative of the invention and should not be taken to be limiting.

Figure 1:
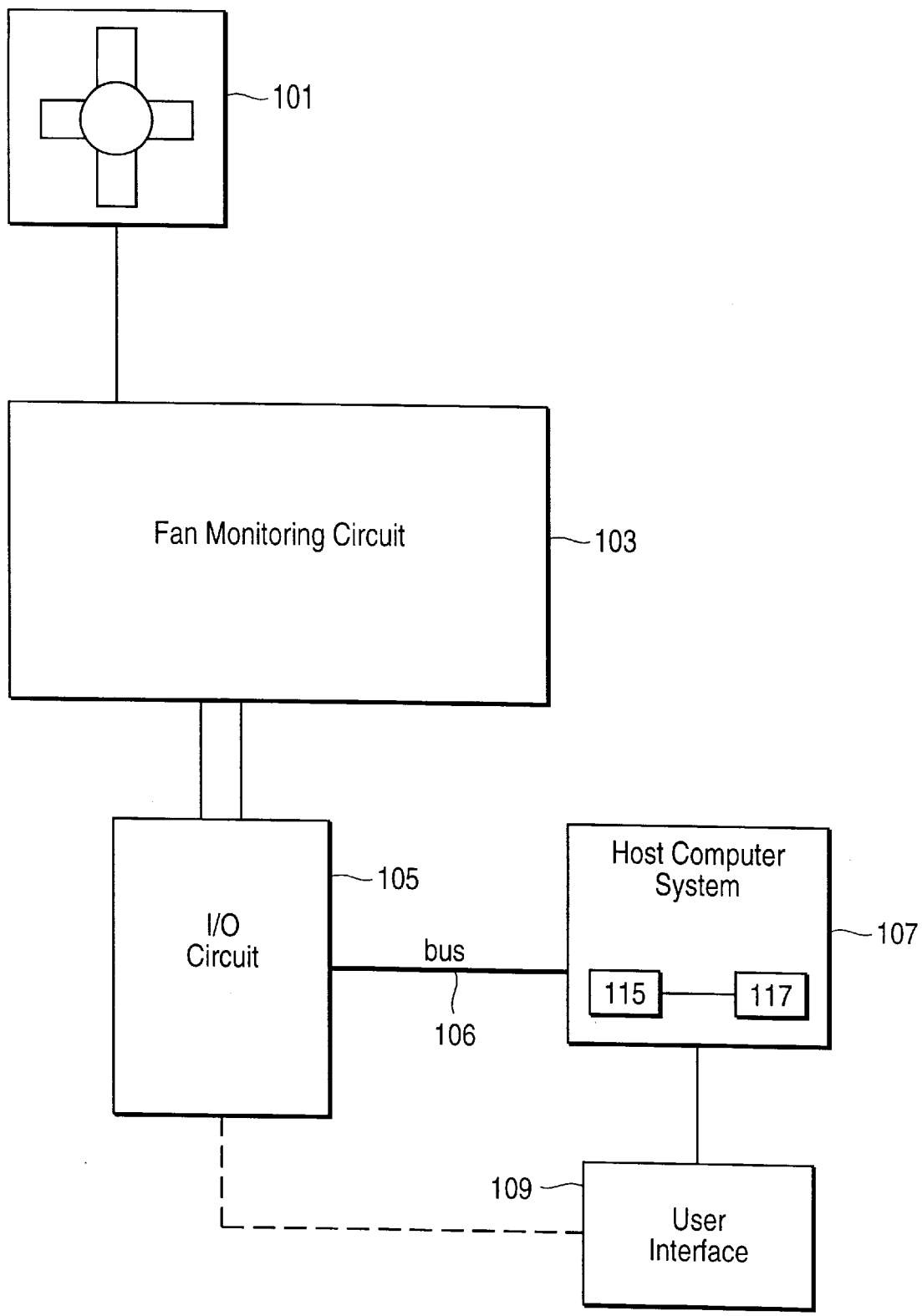
FIG. 1 is a block diagram of the computer system that includes the fan monitoring system of the present invention.

FIG. 1 represents a block diagram of a computer system employing the current invention. The system can be, for example, a personal computer or a server in a PC-LAN system. The computer system includes a fan 101, a fan monitoring circuit 103, and an input/output (I/O) circuit 105. A host computer system 107 and a user interface 109 are also shown. The fan 101 is electrically coupled to the fan monitoring circuit 103. The fan monitoring circuit 103 is also electrically coupled to the I/O circuit 105. The I/O circuit is electrically coupled to the host computer system 107 through a bus 106. In one embodiment, bus 106 conforms to the Industrial Standard Architecture (I.S.A.) standard.

The host computer system 107 includes a main processor 115 and memory 117 which are also electrically coupled to the I/O circuit 105. The host computer system 107 can be the computer system in which the fan 101 is providing ventilation or another computer system that monitors the computer system or other electronic system in which fan 101 is providing ventilation. The I/O circuit 105 is capable of providing I/O signals to the host computer system 107. In one embodiment, the processor 115 monitors or polls the addressable output register or registers (not shown) of the I/O circuit 105 at periodic intervals. In another embodiment, the I/O circuit 105 provides interrupt or exception signals to the processor 115.

The user interface 109 is electrically coupled to the host computer system 107 including the processor 115. In some embodiments, the I/O circuit 105 is directly and electrically coupled to the user interface 109. In one embodiment, the user interface 109 includes a monitor or screen display capable of displaying information in the form of words, objects, or a combination of both. In other embodiments, the user interface may include a warning light or an audio speaker.

Figure 2:
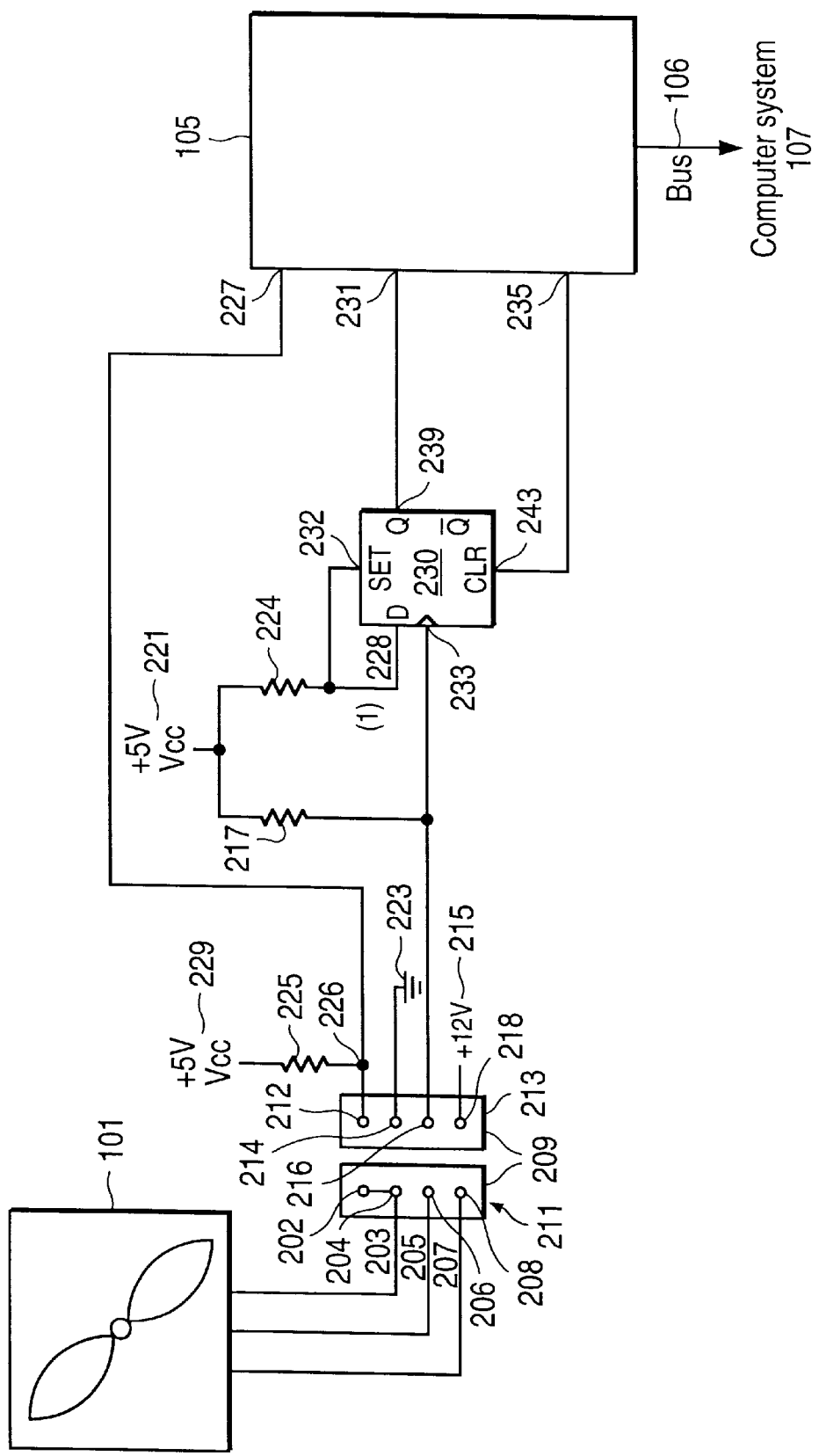
FIG. 2 is a schematic of the fan monitoring system that monitors fan rotation and fan presence in accordance with an embodiment of the invention.

Referring to FIG. 2, fan 101 is a three wire fan where one of the wires, the power connection wire 207, connects the fan 101 to a power source, the second wire, the return wire 203, connects the fan 101 to a ground or negative voltage source, and the third wire, the signal wire 205, is capable of providing a square wave pulse signal where the pulses occur at a frequency that is proportional to the frequency of rotation of the fan 101. Fan 101 can be physically mounted in the protective housing of the computer system or another electronic system. An example of fan 101 is the NMB 3610KL-04WB59-P50 FAN.

The fan 101 is electrically coupled to the fan monitoring circuit via a connection plug 209. Connection plug 209 is a four pin connection plug that is non standard with the NMB fan 101. One end of connection plug 209 is connection end 211 which contains four pins. The first pin 208 of connection end 211 is attached to the power connection wire 207. The second pin 206 of connection end 211 is attached to the signal wire 205. The third pin 204 of connection end 211 is attached to the return wire 203. The fourth pin 202 of connection end 211 is connected to the third pin 204.

The other connection end 213 of connection plug 209 also contains four pins. The first pin 218 is connected to a +12 volt DC power supply 215 located within the computer system. The second pin 216 is connected to a resistor 217 and to the clock input 233 of a D-type, rising edge flip-flop 230 (Texas Instruments 74F74). The third pin 214 of connector 213 is connected to a ground 223. The fourth pin 212 of connector 213 is connected to a primary connection point 226. The primary connection point 226 is connected to the input 227 of the I/O circuit 105 and to one end of resister 225. The other end of resistor 225 is connected to a +5 volt DC power source 229.

The other end of resistor 217 is connected to another +5 volt power supply 221. In one embodiment of the present invention, power supplies 229 and 221 are the same power supply. In another embodiment, power supplies 229 and 221 may be at a different voltage or voltages. Resistor 224 is connected to power supply 221 at one end and to the D-input 228 and set input 232 of flip-flop 230 at the other end. The Q-output 239 of flip-flop 230 is connected to the I/O circuit 105 at the I/O circuit input 231. The Q-output 239 provides an operating signal indicative of the fan 101 rotating to the I/O circuit 105. The I/O circuit 105 also provides a reset signal at I/O output 235 to the clear input 243 of flip-flop 230.

The I/O circuit 105 is a National Register PC9011 or general purpose I/O register. Other types of I/O circuits that may be used are the 8722 Intel keyboard controller or the Intel 8051 microcontroller. In other embodiments, the I/O circuit is a processor with associated logic circuitry or logic circuitry with a readable or addressable port capable of being electrically coupled to a processor.

Figure 3:
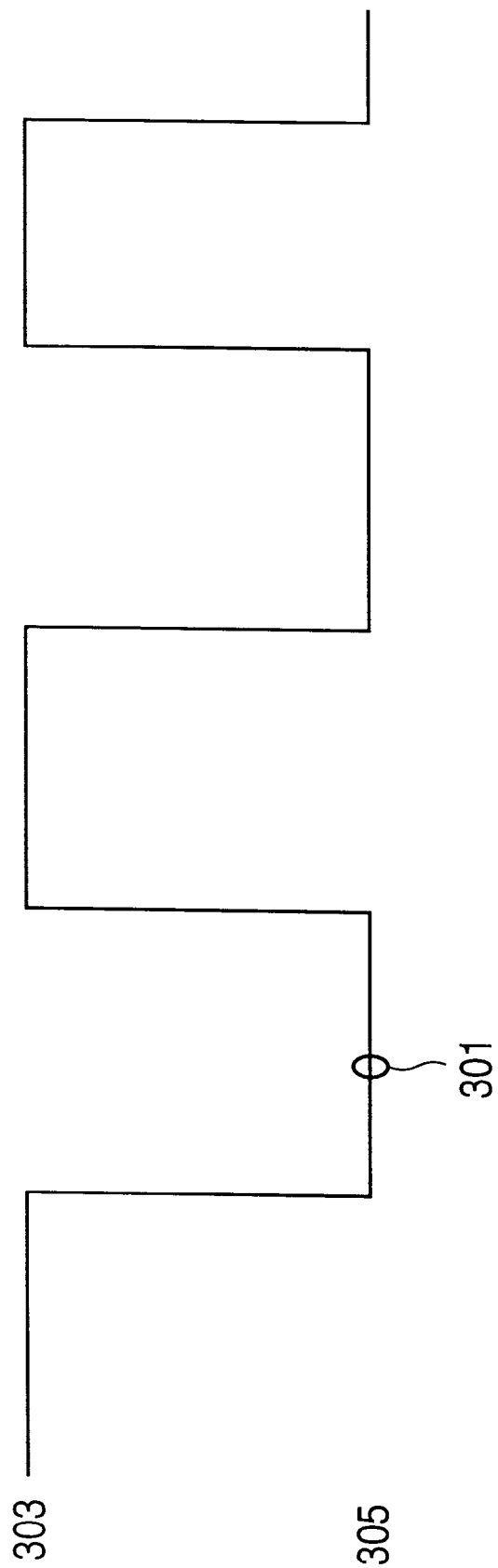
FIG. 3 is a diagram of the square wave pulse signal produced by the fan monitoring system of FIG. 2.

Referring to FIG. 3, a square wave pulse signal 301 is produced on signal wire 205. The square wave pulse signal 301 is a series of square wave pulses where the pulses occur at a frequency that is proportional to the frequency of the rotation of the fan 101. FIG. 3 shows the square wave pulse signal 301 at the input 233 of flip-flop 230. The square wave pulse signal 301 oscillates between a higher voltage level 303 and a lower voltage level 305 at a frequency that is proportional to of the frequency of rotation of the fan 101.

The operation of the fan monitoring system performing rotation detection is as follows. Referring to FIG. 2, a rotation signal such as the square wave pulse signal 301 as shown in FIG. 3 is produced at the clock input 233 of flip-flop 230. The data input 228 of flip-flop 230 is at a constant +5 volts. Thus, every time the square wave pulse signal 301 rises from a lower voltage level 305 to a higher voltage level 303, the Q-output 239 of flip-flop 230 is latched at a high voltage. Upon receiving the high voltage output signal from the Q-output 239 of flip-flop 230, the I/O circuit 105 generates a reset signal on I/O output 235. This reset signal causes the Q-output 239 to be reset to a low voltage level.

A high voltage level on the Q-output 239 of flip-flop 230 indicates to the I/O circuit 105 that the fan 101 is rotating. By resetting flip-flop 230 with the clear signal at input 243, the I/O circuit 105 can continuously monitor whether the fan 101 is operating or continuing to rotate. If the fan were to cease rotating, the square wave pulse signal 301 would cease transitioning from a lower voltage level 305 to a higher voltage level 303 at the clock input 233 of flip-flop 230. Thus, the Q-output 239 of flip-flop 230 would cease being latched at a high voltage level and would remain at a low voltage level.

Providing a latched output at output 239 of the flip-flop 230 in response to the rotation signal advantageously provides an operating signal indicative of fan rotation that is represented by, in the embodiment shown, a high voltage level indicating that the fan 101 is rotating and a low voltage level indicating that the fan 101 is not rotating.

The I/O circuit 105 provides an I/O rotation signal to the host computer system 107 on bus 106 that is indicative of whether the fan 101 rotating. The I/O circuit 105 continually provides the I/O rotation signal as long the I/O circuit 105 continues to receive a high voltage level on input 231. In an alternative embodiment, the I/O rotation signal would be provided by the I/O circuit 105 only if the I/O circuit 105 ceases to sense that the fan 101 is rotating from the I/O input 231.

The operation of the fan monitoring system performing fan presence detection is as follows. One end of resistor 225 is connected to the +5 volt power supply 229. The other end of resistor 225 is connected to a primary connection point 226. The primary connection point 226 is connected to the fourth pin 212 of connection end 213. The fourth pin 202 on connection end 211, is tied directly to the third pin of connection end 211 which is connected to the return wire 203 of the fan 101. When connection end 211 is mated with or attached to connection end 213, the return wire 203 is electrically coupled to ground 223, via the third pins 204 and 214 of connection ends 211 and 213, respectively. Thus, when connection ends 211 and 213 are mated, the primary connection point 226 is also electrically coupled to ground 223.

Coupling the primary connection point 226 to ground 223 pulls the voltage level at that point to the voltage level of ground 223. This voltage level is a detection signal that is read by input 227 of the I/O circuit 105. Thus, when the voltage level at input 227 is approximately the low voltage level of ground 223, this indicates that the connection ends 211 and 213 are mated or attached, and therefore, the fan is installed in the protective housing.

If connection ends 211 and 213 are not mated or attached, the primary connection point 226 is only connected to input 227 and to one end of resistor 225 with the other end of resistor 225 being connected to the +5 volt power source 229. Because the primary connection point 226 is not electrically coupled to a ground, there is little to no voltage drop across resister 225. Thus, the voltage level at the primary connection point 226 (and input 227) is approximately the same high level as power source 229. Consequently, a voltage level at input 227 being at the high level of power source 229 indicates that connection ends 211 and 213 are not mated, and therefore, the fan 101 is not installed in the computer system.

The I/O circuit 105 provides an I/O detection signal to the host computer system 107 on bus 106 that is indicative of whether the fan 101 is installed. The I/O circuit 105 continually provides the I/O detection signal as long the I/O circuit 105 continues to receive a low voltage level on input 227. In an alternative embodiment, the I/O detection signal would be provided by the I/O circuit 105 only if the I/O circuit 105 senses that the fan 101 is not installed from input 227.

One advantage of providing an I/O detection signal is that some computer systems may be pre-wired for additional fans. Thus, a computer system receiving a signal that one of the fans is not rotating would erroneously inform the user of a problem or would obtain an erroneous result if the rotation frequency of the fan was an input to a computer program. Thus, the I/O detection signal provides a way for the computer system 107 to discriminate between those instances where an indication of a lack of fan rotation is due to a fan malfunctioning and those instances where a lack of fan rotation is due to a fan not being installed.

Another advantage of providing an I/O detection signal is that it provides an efficient method of testing whether a fan was properly connected after being physically installed in the computer system or if the fan was installed at all in a computer system during manufacturing.

The I/O circuit 105 is capable of providing other I/O signals to the host computer system 107 (or the user interface 109) that indicate a combination of conditions as determined by both the presence detection portion and the fan rotation portion of the fan monitoring system. These I/O combination signals include an I/O malfunction signal, an I/O absent signal, an I/O fan Ok signal, and an I/O error signal.

The I/O malfunction signal indicates that the fan 101 is installed but is not rotating. The I/O circuit 105 provides the I/O malfunction signal if the I/O circuit 105 receives a continuous low voltage level on I/O input 231 and receives a low voltage level on I/O input 227.

The I/O absent signal indicates that the fan 101 is not installed and is not rotating. The I/O circuit 105 provides the I/O absent signal if the I/O circuit 105 receives a continuous low voltage level on I/O input 231 and receives a high voltage level on I/O input 227.

One advantage of providing a fan malfunction signal and a fan absent signal is that some computer systems may be pre-wired for additional fans. Thus, a computer system receiving a signal that one of the fans is not rotating would erroneously inform the user of a problem. However, by providing a fan malfunction signal and/or a fan absent signal, the computer system would be able to discriminate those instances where a no rotation signal is due to a fan malfunctioning and those instances where a no rotation signal is due to a fan not being installed.

The I/O fan Ok signal indicates that the fan 101 is installed and is rotating. The I/O circuit 105 provides the I/O fan Ok signal if the I/O circuit 105 continues to receive a high voltage level on I/O input 231 and a low voltage level on I/O input 227. One advantage of providing a fan Ok signal is that the computer system knows that the fan 101 and the fan monitoring system are operating properly.

The I/O error signal indicates a logically false condition that the fan 101 is not installed but is rotating. The I/O circuit 105 provides the I/O fan Ok signal if the I/O circuit 105 continues to receive a high voltage level on I/O input 231 and a high voltage level on I/O input 227.

One advantage of providing an I/O error signal is that it gives the fan monitoring system a redundancy feature. In a fan rotation signal was erroneously provided to or received by the I/O circuit 105, then the host computer system 107 knows that a fan is not present and that there is a problem with the fan motoring circuit.

The processor 115, included within the host computer system 107, monitors the I/O signals, namely the I/O rotation signal, the I/O detection signal, the I/O malfunction signal, the I/O absent signal, the I/O fan Ok signal, and the I/O error signal. The processor 115 may monitor the I/O signals continuously or at periodic intervals. For example, the processor 115 may poll the output register or registers (not shown) of the I/O circuit 105 that provides these I/O signals. In an alternative embodiment, the I/O circuit 105, such as the Intel 8051 microcontroller, sends an interrupt or exception signal or signals to the processor 115, indicating that a change in status for a specific condition being monitored for has occurred. For example, the I/O circuit 105 may generate an interrupt indicating that the fan 101 is not rotating, or the I/O circuit 105 may generate an interrupt indicating that the fan 101 is not installed.

The processor 115 directs the user interface 109 in displaying a message on a computer screen (not shown) or to provide other types of information signals that inform a user that one of the conditions as indicated by the I/O signals has occurred or has not occurred. For example, the processor 115 may execute a computer program that directs the user interface 109 to display on a computer screen (not shown) a message that the fan 101 is not working or that the fan 101 is not properly installed. In other examples, the computer screen may display an icon indicating that the fan 101 is running, or the computer screen may display a flashing icon indicating a problem with the fan monitoring system. Some examples of other types of information signals that the user interface 109 may provide or display include turning on a warning light or producing a warning sound on a speaker.

In another embodiment, the I/O circuit 105 sends the I/O signals directly to a user interface 109. The user interface 109 displays a message or other types of information signals to inform a user that one of the conditions indicated by the I/O signals has occurred or has not occurred.

In other embodiments, the I/O circuit 105 may not generate all of the I/O signals. For example, the I/O circuit 105 may only generate the I/O fan malfunction signal. In other embodiments, the processor 115 or user interface may not receive or monitor all of the I/O signals provided by the I/O circuit 105. In other embodiments, the processor 115 may monitor some of the I/O signals and the user interface 109 may receive the other I/O signals.

In another embodiment, the processor 115 receives or monitors only the I/O rotation signal and the I/O detection signal and logically determines the status of the other conditions indicated by the other four I/O signals.

In other embodiments, the processor 115 may monitor the I/O signals for other purposes other than providing user interface information. For example, the processor may use the information indicated by the I/O detection signal in a computer program that measures fan frequency or to begin to execute a computer program to monitor the frequency of a newly installed fan. Also, the processor may shut down an additional power supply or other peripheral device, or even the entire computer system, if it detects or fails to detect the I/O rotation signal or the I/O detection signal. If the processor 115 shuts down the computer system, the processor 115 may log, in a non volatile RAM, the condition which necessitated the shutdown before actually shutting down the computer system.

OTHER EMBODIMENTS

In other embodiments of the invention, the return wire 203 of the fan 101 could be electrically coupled to a negative power supply instead of ground 223. With minor modifications to the above embodiment, the circuit could still perform the fan monitoring functions.

In other embodiments of the invention, other types of electronic storage elements may be used, with minor modifications to the circuit, in place of the rising edge D flip-flop 230. Those storage elements include falling edge flip-flops, D-latch flip-flops, SR flip-flops, T flip-flops, J-K flip-flops, latches, registers, or any electronic storage element or programmable logic capable have having a latched output and capable of being cleared or reset.

In other embodiments, other devices may be used to by the fan monitoring system to perform the operation of presence detection of fan 101. For example the electrical connection plug 209 may include a mechanical switch or electrical relay that closes (or opens) when the connection ends 211 and 213 are mated. The switch could be connected to point 226 and to ground 223 and thus eliminating the need for 226 to be electrically connected to connection end 213.

While particular embodiments of the present invention have been shown and described, it will be obvious to those skilled in the art that changes and modifications may be made without departing from this invention and it's broader aspects and, therefore, the appending claims are to encompass within their scope all such changes and modifications as all within the true spirit and scope of this invention.

What is claimed is:

1. A fan monitoring system comprising:
a fan, the fan providing a fan rotation signal as a function of fan rotation;
a detection circuit, the detection circuit including an electronic storage element having an input and an output, the output providing an operating signal indicative of the fan rotating, the input receiving the rotation signal, the electronic storage element latching at the output the operating signal in response to the rotation, signal;
an input/output (I/O) circuit, the I/O circuit electrically coupled to the output of the electronic storage element, the I/O circuit having an output for providing a reset signal for resetting the electronic storage element, the electronic storage element having an input for receiving the reset signal, the I/O circuit resets the electronic storage element in response to the operating signal being latched.

2. The fan monitoring system of claim 1 wherein:
the fan rotates at a speed;
the rotation signal being an oscillating waveform at a frequency, the frequency proportional to the speed.

3. The fan monitoring system of claim 1 further comprising:
a host computer system including a processor, the host computer system electronically coupled to the I/O circuit by a bus, the I/O circuit providing an I/O rotation signal indicative of whether the fan is rotating as determined by the operating signal, the I/O circuit providing the I/O rotation signal to the host computer system.

4. The fan monitoring system of claim 1, the fan being a three wire fan, the first wire electrically coupling the fan to a power source, the second wire providing the rotation signal, the third wire electrically coupling the fan to a ground.

5. The fan monitoring system of claim 1 further comprising:
a user interface, the user interface electrically coupled to the I/O circuit, the user interface capable of providing at least one information signal to a user, the I/O circuit providing an I/O rotation signal to the user interface indicative of whether the fan is rotating as determined by the operating signal, the user interface providing an information signal of whether the fan is rotating.

6. A fan monitoring system comprising:
a fan;
a fan detection circuit, the fan detection circuit providing a detection signal indicative of whether or not the fan is installed in an electronic system, the fan detection circuit providing a detection signal indicative of whether or not a return connection of the fan is electrically coupled to a ground;
a primary connection point, the detection signal being proportional to the voltage level at the primary connection point, wherein when the return connection of the fan is electrically coupled to the ground, the primary connection point is electrically coupled to the ground.

7. The fan monitoring system of claim 6 wherein:
the voltage level of the detection signal capable of existing at a first level and a second level, the voltage level of the detection signal existing at a first level when the fan is installed in the electronic system, the voltage level existing at a second level when the fan is not installed in the electronic system.

8. A fan monitoring system comprising:
a fan;
a fan detection circuit, the fan detection circuit providing a detection signal indicative of whether or not the fan is installed in an electronic system;
a first connecting device, electrically coupled to a power connection of the fan and a return connection of the fan;
a second connecting device, electrically coupled to a ground and to a power supply, when the first connecting device and the second connecting device are attached, the power connection is electrically coupled to the power supply and the return connection is electrically coupled to the ground;
wherein the fan detection circuit providing the detection signal indicative of whether or not the first connecting device and the second connecting device are attached.

9. The fan monitoring system of claim 8, the detection circuit further including:
a primary connection point, the detection signal being proportional to the voltage level at the primary connection point, wherein the second connecting device is electrically coupled to the primary connection point, where the first connecting device includes an attachment point, the attachment point electrically coupled to the return connection, wherein when the first connecting device is attached to the second connecting device, the primary connection point is electrically coupled to the attachment point.

10. The fan monitoring system of claim 8, the detection circuit further including:

a primary connection point, the detection signal being proportional to the voltage level at the primary connection point, wherein when the first connecting device and the second connecting device are attached, the primary connection point is electrically coupled to the ground.

11. The fan monitoring system of claim 10, the fan detection circuit including a resistive element having two connection points, the first connection point being at a constant voltage level, the second connection point electrically coupled to the primary connection point.

12. A computer system comprising:

a fan, the fan providing a fan rotation signal as a function of fan rotation;

a processor;

a fan monitoring circuit, the fan monitoring circuit including an electronic storage element having an input and an output, the output providing an operating signal indicative of the fan rotating, the input receiving the rotation signal, the electronic storage element providing at the output the operating signal in response to the rotation signal;

an input/output (I/O) circuit, the I/O circuit electrically coupled to the output of the electronic storage element, the I/O circuit electrically coupled to the processor, the I/O circuit receiving the rotation signal, the I/O circuit providing to the processor an I/O rotation signal indicative of whether the fan is rotating as determined by the operating signal;

wherein the I/O circuit sends the I/O rotation signal to the processor in response to the fan not rotating, wherein the I/O signal is an interrupt, wherein sending the I/O signal to the processor in response to the fan not rotating includes the I/O circuit generating an interrupt to the processor in response to the fan not rotating.

13. A computer system comprising:

a fan, the fan providing a fan rotation signal as a function of fan rotation;

a processor;

a fan monitoring circuit, the fan monitoring circuit including an electronic storage element having an input and an output, the output providing an operating signal indicative of the fan rotating, the input receiving the rotation signal, the electronic storage element providing at the output the operating signal in response to the rotation signal;

an input/output (I/O) circuit, the I/O circuit electrically coupled to the output of the electronic storage element, the I/O circuit electrically coupled to the processor, the I/O circuit receiving the rotation signal, the I/O circuit providing to the processor an I/O rotation signal indicative of whether the fan is rotating as determined by the operating signal;

wherein the processor monitors the status of the I/O rotation signal at periodic intervals.

14. A computer system comprising:

a fan, the fan providing a fan rotation signal as a function of fan rotation;

a processor:

a fan monitoring circuit, the fan monitoring circuit including an electronic storage element having an input and an output the output providing an operating signal indicative of the fan rotating, the input receiving the rotation signal, the electronic storage element providing at the output the operating signal in response to the rotation signal;

an input/output (I/O) circuit, the I/O circuit electrically coupled to the output of the electronic storage element, the I/O circuit electrically coupled to the processor, the I/O circuit receiving the rotation signal, the I/O circuit providing to the processor an I/O rotation signal indicative of whether the fan is rotating as determined by the operating signal;

a user interface, the user interface electrically coupled to the processor, the user interface capable of providing at least one information signal to a user, the processor directing the user interface to provide an information signal indicative of fan rotation as determined by the I/O rotation signal.

15. A computer system comprising.

a fan, the fan capable of being electrically coupled to the computer system;

a fan monitoring circuit, the fan monitoring circuit providing a detection signal indicative of whether or not the fan is electrically coupled to the computer system;

a processor, an input/output (I/O) circuit, electrically coupled to the processor, the I/O circuit electrically coupled to the fan monitoring circuit, the I/O circuit receiving the detection signal, the I/O circuit providing to the processor an I/O detection signal indicative of whether the fan is electrically coupled to the computer system as determined by the detection signal;

wherein the processor monitors the status of the I/O detection signal at periodic intervals.

16. The computer system of claim 15 further comprising:

a periphery device electrically coupled to the computer system;

the processor shutting down the periphery device in response to the I/O detection signal indicating that the fan is not electrically coupled to the computer system.

17. The computer system of claim 15 wherein:

the processor initiates a computer program for monitoring fan rotation in response to the I/O detection signal indicating that the fan is electrically coupled to the computer.

18. The computer system of claim 15 further comprising:

a ground, the fan monitoring circuit providing the detection signal indicative of whether or not a return connection of the fan is coupled to the ground.

19. A computer system comprising:

a fan, the fan capable of being electrically coupled to the computer system;

a fan monitoring circuit, the fan monitoring circuit providing a detection signal indicative of whether or not the fan is electrically coupled to the computer system;

a processor, an input/output (I/O) circuit electrically coupled to the processor, the I/O circuit electrically coupled to the fan monitoring circuit, the I/O circuit receiving the detection signal, the I/O circuit providing to the processor an I/O detection signal indicative of whether the fan is electrically coupled to the computer system as determined by the detection signal;

wherein the I/O circuit sends the I/O signal to the processor in response to the fan not being electrically coupled to the computer system as determined by the detection signal, wherein the I/O signal is an interrupt, wherein sending the I/O signal to the processor in response to the fan not being electrically coupled to the computer system includes the I/O circuit generating an interrupt to the processor in response to the fan not being electrically coupled to the computer system as determined by the detection signal.

20. The computer system of claim 19 further comprising:
a periphery device electrically coupled to the computer system;
the processor shutting down the periphery device in response to the I/O detection signal indicating that the fan is not electrically coupled to the computer system.

21. The computer system of claim 19 wherein:
the processor initiates a computer program for monitoring fan rotation in response to the I/O detection signal indicating that the fan is electrically coupled to the computer.

22. The computer system of claim 19 further comprising:
a ground, the fan monitoring circuit providing the detection signal indicative of whether or not a return connection of the fan is coupled to the ground.

23. A computer system comprising:
a fan, the fan capable of being electrically coupled to the computer system;
a fan monitoring circuit, the fan monitoring circuit providing a detection signal indicative of whether or not the fan is electrically coupled to the computer system;
a processor,
an input/output (I/O) circuit, electrically coupled to the processor, the I/O circuit electrically coupled to the fan monitoring circuit the I/O circuit receiving the detection signal, the I/O circuit providing to the processor an I/O detection signal indicative of whether the fan is electrically coupled to the computer system as determined by the detection signal,
a power supply;
a ground;
a first connecting device, electrically coupled to a power connection of the fan and a return connection of the fan;
a second connecting device, electrically coupled to the ground and to the power supply, when the first connecting device and the second connecting device are attached, the power connection is electrically coupled to the power supply and the return connection is electrically coupled to the ground, wherein the fan detection circuit providing the detection signal indicative of whether or not the first connecting device and the second connecting device are attached;
wherein the detection circuit further includes a primary connection point, the detection signal being proportional to the voltage level at the primary connection point, wherein when the first connecting device and the second connecting device are attached, the primary connection point is electrically coupled to the ground.

24. A computer system comprising:
a fan, the fan capable of being electrically coupled to the computer system;
a fan monitoring circuit, the fan monitoring circuit providing a detection signal indicative of whether or not the fan is electrically coupled to the computer system;
a processor,
an input/output (I/O) circuit, electrically coupled to the processor, the I/O circuit electrically coupled to the fan monitoring circuit, the I/O circuit receiving the detection signal, the I/O circuit providing to the processor an I/O detection signal indicative of whether the fan is electrically coupled to the computer system as determined by the detection signal;
a user interface, the user interface electrically coupled to the processor, the user interface capable of providing at least one information signal to a user, the processor directing the user interface to provide an information signal indicative of fan detection as determined by the I/O detection signal.

25. A computer system comprising:
a processor;
a fan, the fan providing a fan rotation signal as a function of fan rotation, the fan capable of being electrically coupled to the computer system;
a fan monitoring circuit including:
    a fan presence detection circuit, the fan detection circuit providing a detection signal indicative of whether or not the fan is coupled to the computer system;
    a rotation detection circuit, the rotation detection circuit receiving the rotation signal, the rotation detection circuit providing an operating signal indicative of fan rotation in response to the rotation signal;
an input/output (I/O) circuit, the I/O circuit electrically coupled to the processor and to the fan monitoring circuit, the I/O circuit receiving the detection signal and the operating signal, the I/O circuit providing an I/O signal to the processor as determined by the operating signal and the detection signal;
a user interface, the user interface electrically coupled to the processor, the user interface providing at least one information signal to a user as directed by the processor as determined by the I/O rotation signal and the I/O detection signal.

26. The computer system of claim 25 wherein the I/O signal is an I/O power Ok signal indicating that the fan is rotating and that the fan is electrically coupled to the computer system.

27. The computer system of claim 25 wherein the I/O signal is an I/O malfunction signal indicating that the fan is not rotating and that the fan is electrically coupled to the computer system.

28. The computer system of claim 25 wherein the I/O signal is an I/O fan absent signal indicating that the fan is not rotating and that the fan is not electrically coupled to the computer system.

29. The computer system of claim 25 wherein the I/O signal is an I/O error signal indicating that the fan is rotating and that the fan is not electrically coupled to the computer system.

30. The computer system of claim 25 wherein:
the I/O circuit providing to the processor an I/O rotation signal indicative of whether the fan is rotating as determined by the operating signal, the I/O circuit providing to the processor an I/O detection signal indicative of whether the fan is electrically coupled to the computer system as determined by the detection signal.

31. The computer system of claim 25 wherein:
the processor directing the user interface to provide an information signal indicating that the fan is installed in the computer system but is not rotating.

* * * * *